(12) United States Patent
Ostwald

(10) Patent No.: US 6,781,789 B2
(45) Date of Patent: Aug. 24, 2004

(54) DUAL CARTRIDGES STORAGE ARRAY CELL FOR DATA STORAGE

(75) Inventor: Timothy C. Ostwald, Louisville, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

(21) Appl. No.: 09/966,483

(22) Filed: Sep. 28, 2001

(65) Prior Publication Data

US 2003/0063411 A1 Apr. 3, 2003

(51) Int. Cl.[7] ............................................. G11B 15/68
(52) U.S. Cl. ................................................... 360/92
(58) Field of Search ............................... 360/92, 98.04, 360/98.06

(56) References Cited

U.S. PATENT DOCUMENTS

| | | | | |
|---|---|---|---|---|
| 5,089,920 A | * | 2/1992 | Bryer et al. | 360/92 |
| 5,184,260 A | * | 2/1993 | Pierrat | 360/92 |
| 5,508,859 A | | 4/1996 | Hu et al. | 360/92 |
| 6,560,061 B2 | * | 5/2003 | Helmick et al. | 360/92 |

* cited by examiner

*Primary Examiner*—Robert S. Tupper
(74) *Attorney, Agent, or Firm*—Yee & Associates, P.C.

(57) ABSTRACT

A deep storage cell for a data library that allows stacking of cartridges behind one another. Effective wall area is increased by stacking the cartridges two or three deep (or more) in a single storage slot. A spring provides force to expel the cartridges, and a toggle block with a catch lip holds the spring back when cartridges are inserted.

17 Claims, 3 Drawing Sheets

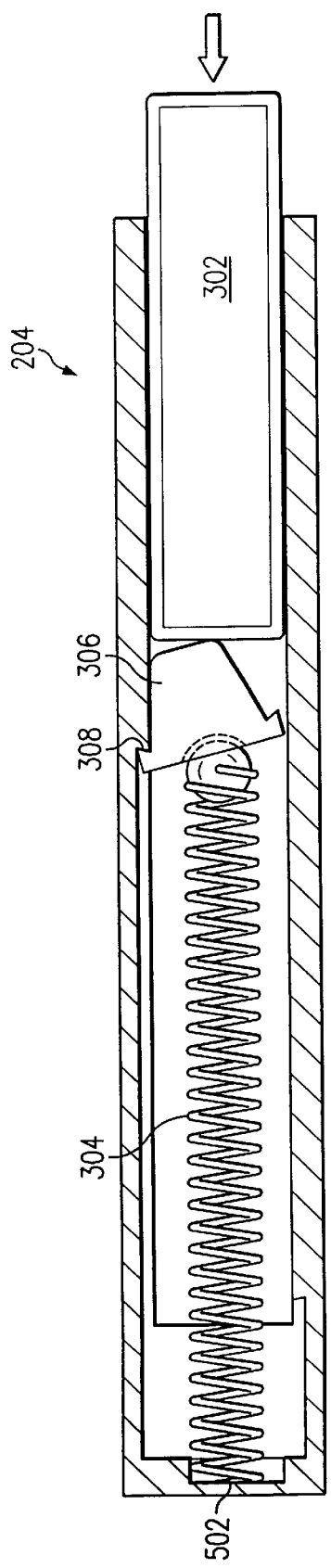
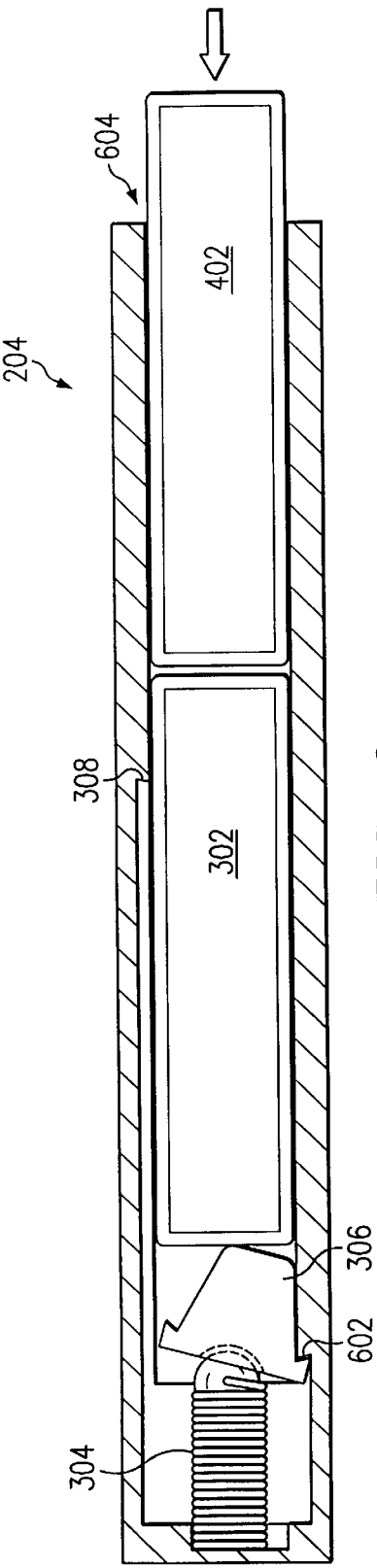
FIG. 5
FIG. 6 ive embodiment when read in conjunction with the
accompanying drawings, wherein:

DUAL CARTRIDGES STORAGE ARRAY CELL FOR DATA STORAGE

BACKGROUND OF THE INVENTION

1. Field of the Invention

The present invention is directed generally toward storage systems for handling data storage cartridges. More specifically, the present invention is directed to storage cells for individual data storage units.

2. Background of the Invention

Robotic media storage libraries are devices for providing automated access to a large collection of data stored on multiple physical storage media, such as magnetic tape cartridges or compact discs. Robotic media storage libraries generally contain a plurality of storage locations for physical media, one or more media drives for reading or writing physical media and a manipulator or "picker" for moving physical media from a storage location to a drive and back. Robotic media storage libraries may have special storage locations designated for certain purposes, such as serving as a temporary storage location while two pieces of media are being swapped or for adding or removing physical media from the library.

Library storage density is limited to the actual volume of the device used to store the physical data cartridges or disks. In some cases this means limited floor space or area, or limited vertical shelf or wall space, depending on the particular configuration of the storage library.

In the typical library scheme, storage capacity is increased by increasing the size of the library itself. This requires increased floor space or increased wall space, depending on the type of library used. The area accessible to a retrieval device also limits the storage capacity of a library, because a retrieval device must have a path to reach each individual data storage element. These goals of decreased overall volume and increased accessible area conflict in storage library design, making storage density a key factor in the library marketplace.

Therefore, it would be advantageous to have an improved method and apparatus for storing media in a storage library.

SUMMARY OF THE INVENTION

The present application provides a deep storage cell capable of holding multiple individual data storage elements (cartridges, for example). In a preferred embodiment, the storage cell has a spring, which provides force to eject data storage elements. This spring preferably has a toggle block, which catches on one or more catch lips, holding the spring in place. For example, when one cartridge is inserted into the cell, the spring is compressed to catch on a first catch lip. When a second cartridge is inserted, the first cartridge is pushed further back within the storage cell, further compressing the spring so that the toggle block catches on a second catch lip, providing space for both cartridges. Multiple data cartridges can be thus stored in a single storage cell.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 shows a side view of an individual storage cell in accordance with a preferred embodiment of the present invention.

FIG. 6 shows a side view with two inserted cartridges in accordance with a preferred embodiment of the present invention.

DETAILED DESCRIPTION OF THE PREFERRED EMBODIMENTS

Figure 1:
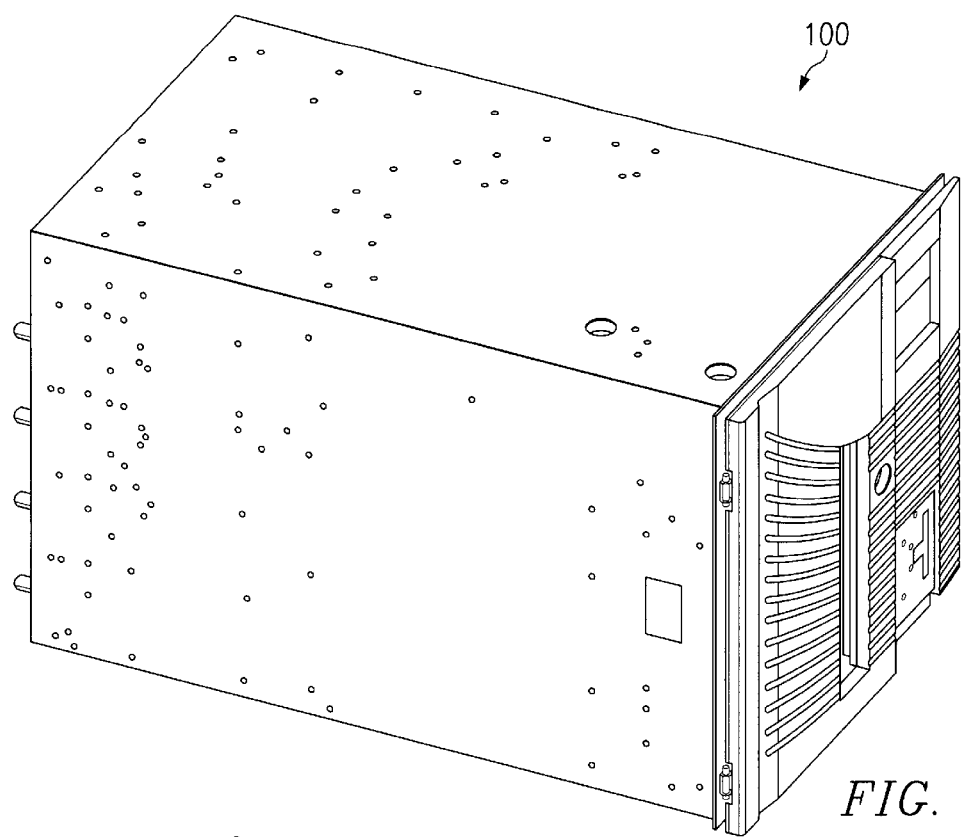
FIG. 1 shows a data cartridge storage library in accordance with a preferred embodiment of the present invention.

FIG. 1 shows a data cartridge storage library 100 for automated storage and use of data cassettes in accordance with a preferred embodiment of the present invention.

Figure 2:
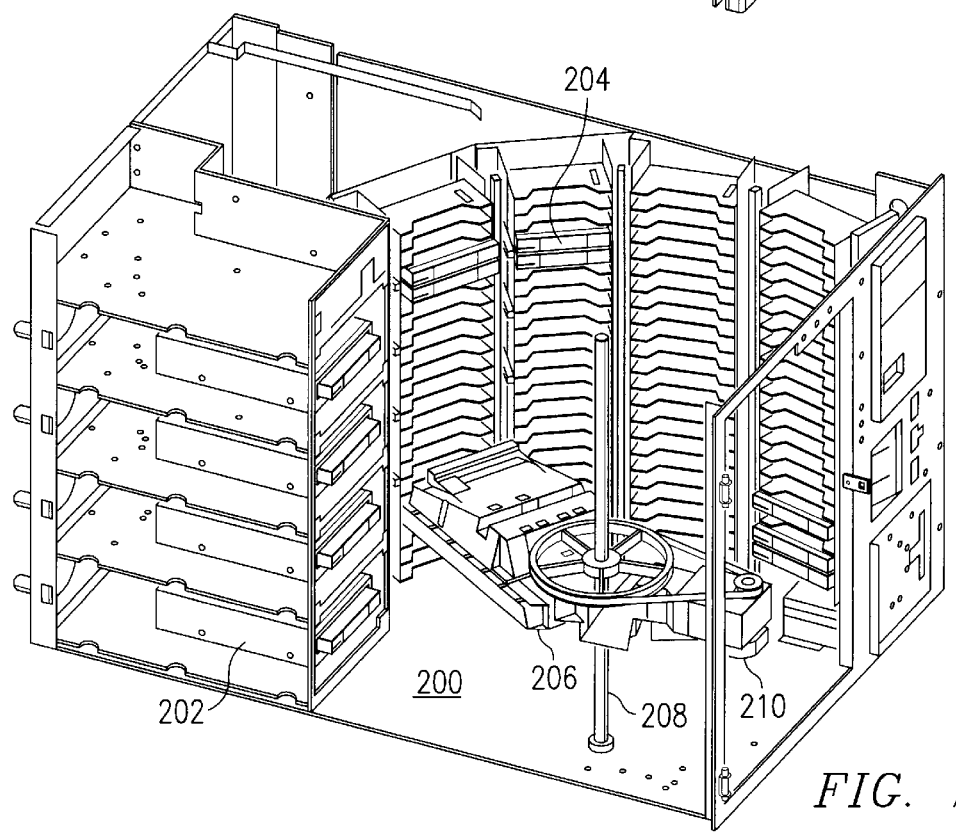
FIG. 2 shows an internal cutaway view of a data storage library in accordance with a preferred embodiment of the present invention.

FIG. 2 provides an internal cutaway view of library 100 in accordance with a preferred embodiment of the present invention. Chassis 200 provides a framework for cassette recorders 202, cassette storage cells 204, and robotic picker assembly 206. Robotic picker assembly 206 loads cassettes (or cartridges or disks, depending on the type of library-generically referred to herein as a data storage element) from cassette storage cells 204 to cassette recorders 202 for reading and writing. Likewise, when cassettes are no longer being read or written, robotic picker assembly 206 returns the cassettes to cassette storage cells 204. Robotic picker assembly 206 is capable of rotating about a vertical axis and moving up or down along vertical shaft 208 using servo motors 210 and related control circuitry.

Figure 3:
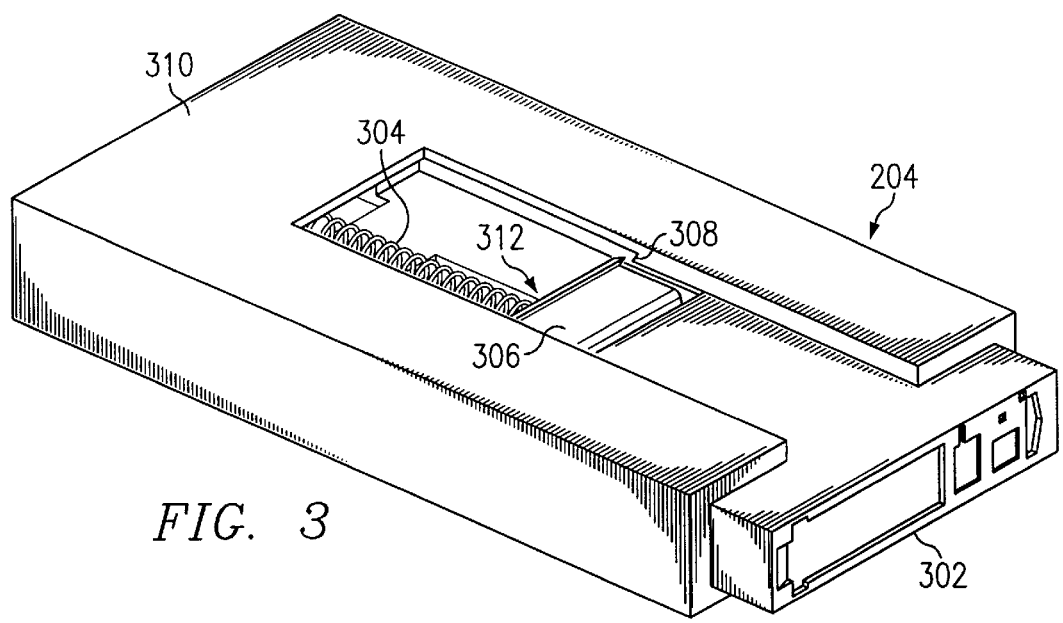
FIG. 3 shows an individual storage cell consistent with a preferred embodiment in accordance with a preferred embodiment of the present invention.

FIG. 3 shows an individual storage cell 204 consistent with a preferred embodiment of the present invention. This example of a storage cell 204 (for use with data cassette or cartridge 302) shows a data cartridge 302 inserted into the front position of the storage cell 204. Behind data cartridge 302, a spring 304 is visible. In preferred embodiments, a spring 304 is attached to the rear of storage cell 204 by one end 310 and has a toggle block 306 on the other end 312. The toggle block 306 catches on a catch lip 308 as shown, preventing the spring from completely ejecting the cartridge 302. The toggle 306 and catch lip 308 are further detailed in later figures.

Though a spring is specifically mentioned in the example embodiments described herein, any biasing mechanism could be used. A spring is preferred because it applies a predetermined force on the cartridges to eject them. Other examples of biasing mechanisms could include some elastic material attached to "pull" the data cartridges from the storage cell, or a lever, which slides to push (or pull) the cartridges out of the storage cell. Of course, the cell could also be tilted or "tiltable" (i.e., of variable tilt angle) so that gravity could cause ejection.

Figure 4:
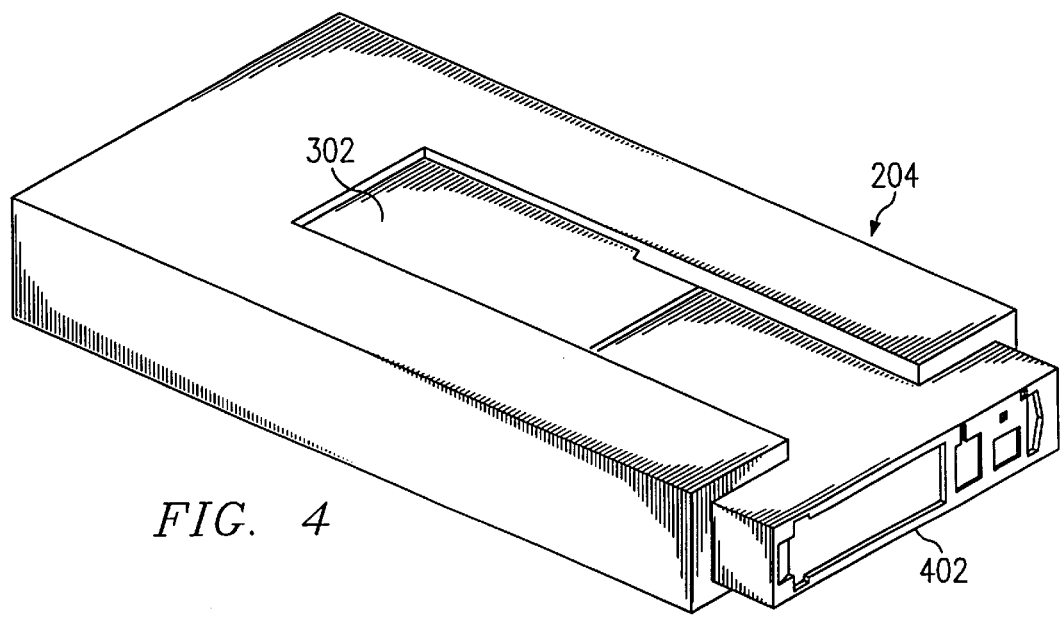
FIG. 4 shows an exterior view of an individual storage cell in accordance with a preferred embodiment of the present invention.

FIG. 4 shows the same view of the storage cell 204 with a second data storage element (cartridge 402) inserted. This figure shows that by inserting the second data cartridge 402, the first data cartridge 302 is moved deeper into storage cell 204, compressing spring 304 (not shown in this figure). It should be noted that the storage cells may contain the individual data cartridges in a variety of ways, either fully containing or partially containing the cartridge, including totally enclosing a cartridge, or holding a cartridge totally within the confines of the storage cell but not enclosed therein, or holding the data cartridge within the storage cell such that the cartridge sticks out the end of the storage cell partially, allowing a mechanical picker to grip it.

FIG. 5 shows a side view of the storage cell 204. In this drawing, a first data cartridge 302 has been inserted through the front opening of the cell 204. Data cartridge 302 abuts toggle block 306, leaving part of data cartridge 302 extended outside cell 204 so that a robotic picker or retrieval device can gain a hold thereon (e.g., by gripping or by magnet). Note that this depicted example only demonstrates one possible configuration. The cassette could also be flush with the opening of the cell, for example, depending on the retrieval means used. Toggle block 306 is depicted caught on catch lip 308, holding toggle block 306 and spring 304 in place. As shown, spring 304 is attached to both the toggle block 306 and the rear 502 of the cell 204.

FIG. 6 shows the same view from the side of storage cell 204. In this figure, a second data cartridge 402 has been inserted after the first data cartridge 302. Inserting second data cartridge 402 has forced first data cartridge 302 back deeper into the cell 204. This has in turn caused compression of spring 304 and moved toggle block 306 back into a position where it catches on a second catch lip 602. Second catch lip 602 holds spring 304 back so that it does not force data cartridges 302, 402 out of cell 204.

As can be seen from the above explanations, this apparatus could be extended to store more than two data storage elements in a single cell.

The removal of cartridges from this apparatus uses the force of the spring to eject cartridges. Referring to FIG. 6, depressing second data cartridge 402 slightly will free toggle block 306 from second catch lip 602 because the line of action of force from data cartridge 308 is below the line of action of force from spring 304, causing toggle block 306 to rotate and unhook from second catch lip 602. Spring 304 will then expand its length, pressing first data cartridge 302 toward the opening 604 in cell 204. As second data cartridge 402 is removed (for example, by a retrieval device, robotic picker, or other means), first data cartridge 302 is free to move toward opening 604 into the position previously occupied by second data cartridge 402. At the point where toggle block 602 reaches catch lip 308, spring 304 is halted, and first data cartridge 302 will once again be in the position as shown in FIG. 5.

If first data cartridge 302 (i.e., a data cartridge stored in the cell 204 behind a second data cartridge 402) is the desired data cartridge, then the retrieval device must first remove the outermost data cartridge (second data cartridge 402 in FIG. 6, referred to also as the "intervening" data cartridge) before removing the desired data cartridge (first data cartridge 302 in FIG. 6). In this case, the retrieval unit preferably places intervening data cartridge 402 in a temporary staging area designed to hold the data cartridge for a short period of time while the desired data cartridge is removed. Depending on the design of the individual library, the data cartridges can be replaced in the same order, or if there are order tracking means, the data cartridges could be replaced in whatever order is most convenient.

A staging area for temporary storage could be within the library itself, or part of a robot picking mechanism, for example. The need for a staging area could be eliminated by using a picking mechanism capable of holding two or more data cartridges at a time, such as that described in U.S. Pat. No. 5,418,644, which describes an indexing robotic hand that can hold two or more data cartridges at a time, for example.

The spring and toggle block scheme as depicted in previous example embodiments is only one possible way of extracting the desired data storage elements from the storage cell. In less preferred embodiments, there is no spring, and a "long reach" robot retrieval device is used to reach deeper inside the storage cell to remove a data storage element from the back of the storage location. Such an embodiment could also be applied in a storage library where the cells are tilted at an angle such that gravity provides the necessary force and friction by which the data storage elements are held within the storage cell.

The innovations of the present invention increase the total storage capability of a data storage library by increasing the effective wall space. The innovative deep storage cells allow a library to store more data by stacking data cartridges behind one another. Though the present innovations have been disclosed in terms of a Cartesian array-type storage scheme, the innovations are equally applicable to other types of library architecture, such as a carousel design. Any design that uses individual storage cells could serve as a context for implementing the present innovations.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data storage library, comprising:
   a plurality of storage cells for storing data storage elements;
   wherein at least one of the storage cells has sufficient volume to contain at least two data storage elements and a biasing mechanism for ejecting at least one of the data storage elements; and
   wherein the biasing mechanism is a spring.

2. The data storage library of claim 1, further comprising a retrieval unit capable of removing storage elements from the storage cell.

3. A storage system, comprising:
   a plurality of storage cells for storing data storage elements; and
   a retrieval unit capable of removing data storage elements from the plurality of storage cells;
   wherein at least one of the storage cells has sufficient volume to contain a plurality of data storage elements and a biasing mechanism with a catch and release mechanism;
   wherein when a first data storage element is positioned in the at least one of the storage cells, the biasing mechanism is held at a first position by the catch and release mechanism such that the first data storage element is accessible to the retrieval unit; and
   wherein when a second data storage element is added to the at least one of the storage cells, the biasing mechanism is held at a second position by the catch and release mechanism such that the second data storage element is accessible to the retrieval unit.

4. The storage system of claim 3, wherein the biasing mechanism is a spring.

5. The storage system of claim 3, wherein the catch and release mechanism comprises a toggle block and first and second catch lips upon which the toggle block catches.

6. The storage system of claim 5, wherein the toggle block catches on the first catch lip when a first data storage element is placed in a first storage cell of the plurality of storage cells, and wherein the toggle block catches on the second catch lip when a second data storage element is placed in the first storage cell.

7. The storage system of claim 3 wherein the retrieval unit is a robotic manipulator capable of clamping on a data storage element.

8. A storage cell for a data storage library, comprising:
   first and second catch lips;
   a biasing mechanism having a toggle block attached thereto;
   whereby when a first data storage element is inserted into the storage cell at a first position, the toggle block catches the first catch lip;
   whereby when a second data storage element is inserted into the storage cell at the first position, the first data storage element is moved to a second position and the toggle block catches a second catch lip.

9. The storage cell of claim 8, wherein the biasing mechanism is a spring.

10. The storage cell of claim 8, wherein when the second data element is removed from the storage cell, the toggle block is released from the second catch lip and the first data storage element is moved to the first position.

11. The storage cell of claim 8, wherein any data storage element in the first position is accessible to a retrieval unit that can remove that data storage element from the storage cell.

12. A storage cell for a data storage library, comprising:
   a front end having an opening for insertion of data storage elements;
   a rear end opposite the front end having a biasing mechanism attached thereto by a first end, the biasing mechanism having a toggle block attached to a second end;
   a plurality of catch lips;
   whereby when a first data storage element is inserted through the front end to a first position, the toggle block catches a first catch lip;
   whereby when a second data storage element is inserted through the front end to the first position, the first data storage element moves to a second position and adjusts the biasing mechanism such that the toggle block catches a second catch lip.

13. The storage cell of claim 12, wherein the biasing mechanism is a spring.

14. The storage cell of claim 12, wherein any data storage element in the first position is accessible to a retrieval unit that can remove that data storage element from the storage cell.

15. The storage cell of claim 12, wherein when the second data storage element is removed from the storage cell, the toggle block is released from the second catch lip and the first data storage element is moved to the first position.

16. A storage cell for a data storage library, comprising:
   an opening for insertion and ejection of data storage elements;
   an ejection mechanism, which provides force to eject data storage elements;
   wherein the ejection mechanism resides in a first position when there is one data storage element inserted into the storage cell; and
   wherein the ejection mechanism resides in a second position when there are two data storage elements inserted into the storage cell.

17. The storage cell of claim 16, wherein the ejection mechanism is a spring.

* * * * *